Oct. 4, 1949.　　　A. G. RICHARDSON　　　2,483,432
RADAR INDICATOR MEANS
Filed July 14, 1945　　　　　　　　　　　3 Sheets-Sheet 3
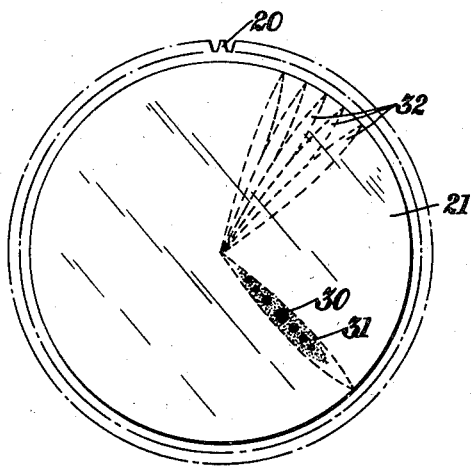
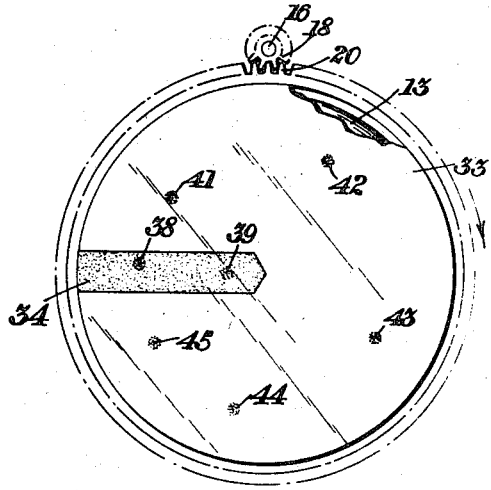
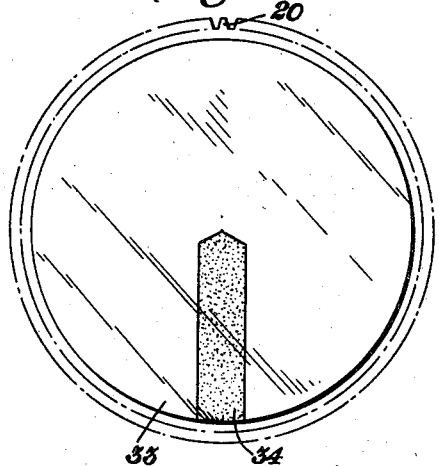
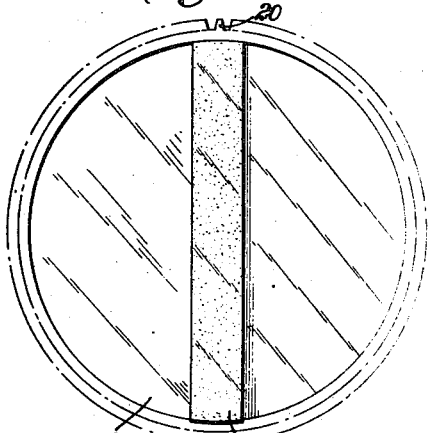
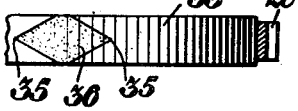
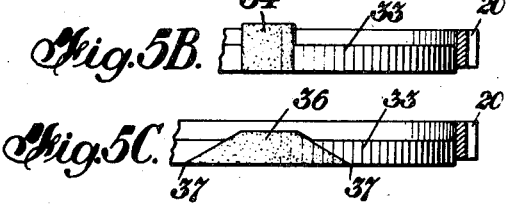
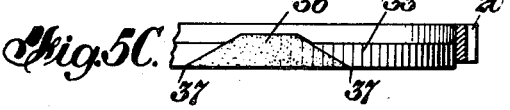
INVENTOR.
AVERY G. RICHARDSON
BY
*Perry P. Lantz*
ATTORNEY Patented Oct. 4, 1949

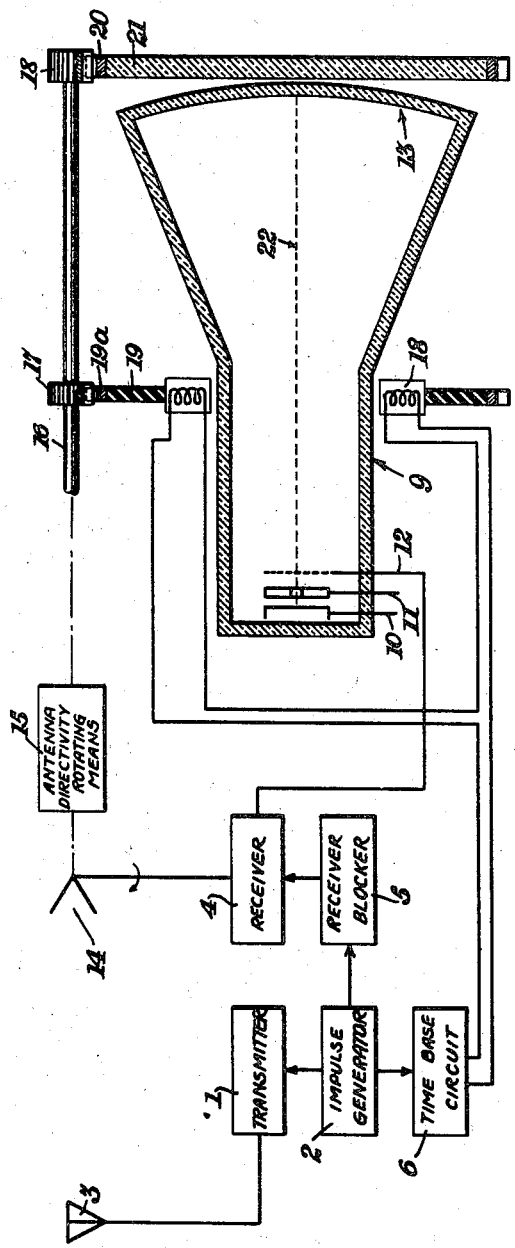

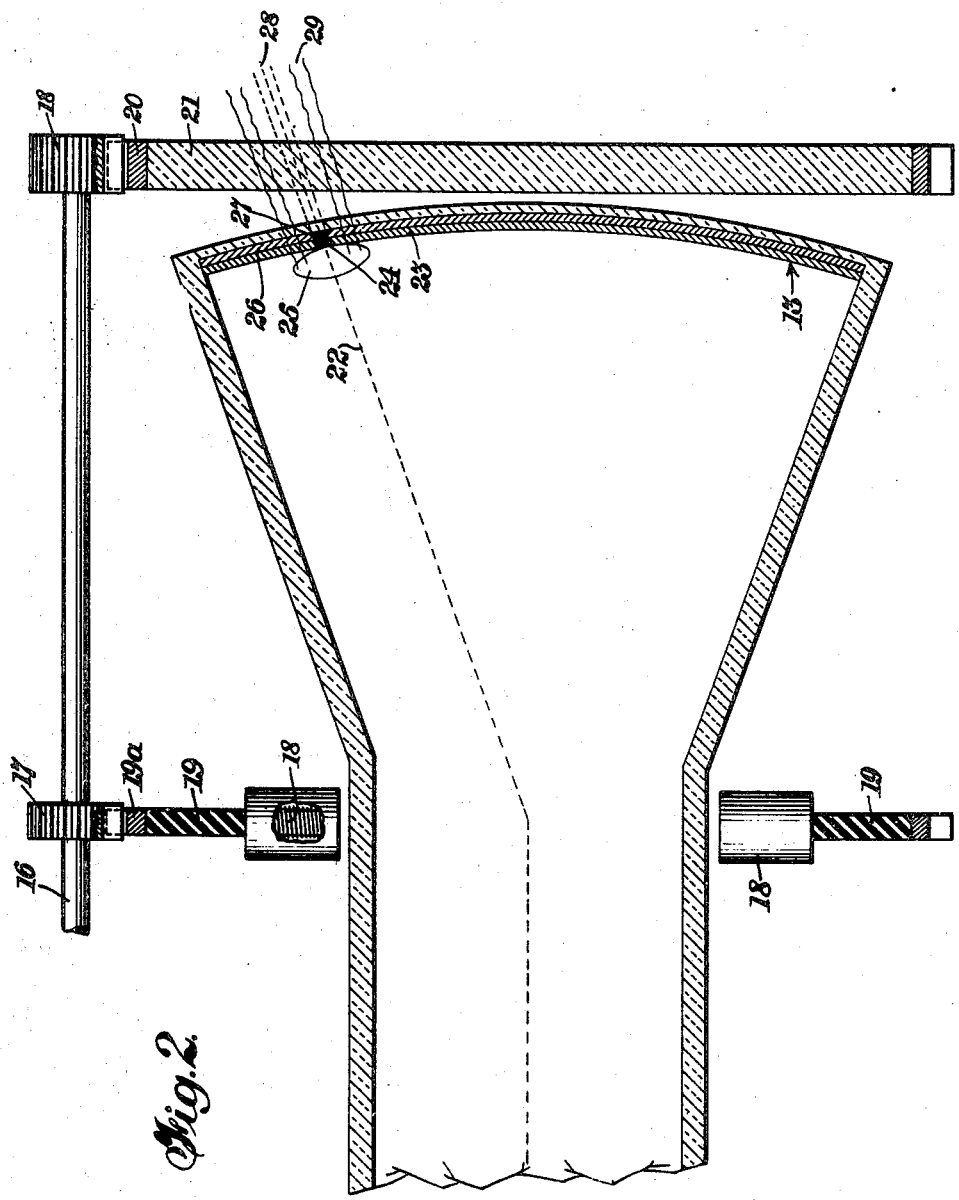

2,483,432

UNITED STATES PATENT OFFICE 2,483,432

RADAR INDICATOR MEANS

Avery G. Richardson, Boonton, N. J., assignor to Federal Telephone and Radio Corporation, New York, N. Y., a corporation of Delaware Application July 14, 1945, Serial No. 605,135

11 Claims. (Cl. 343—11)

This invention relates to filters for luminescent screens of cathode ray tube indicators, and more particularly to methods of and apparatus for preventing unwanted high frequency visible light rays generated within high intensity cathode ray tubes from obscuring wanted signal indications that are simultaneously produced on the screen of the cathode ray tube. In a cathode ray tube indicator having a circularly and radially displaced electron beam impinging on the luminescent screen of a cathode ray tube, the beam, when operated at high intensity, may produce an extremely bright blue line radially of the screen, which rotates in synchronism with the displacement of the electron beam circularly, leaving desired information as a much dimmer afterglow on the screen of the cathode ray tube.

As is well known, the indicators used in certain radar systems or in slow speed radio direction finding systems are of a type known as "long persistence" cathode ray tube indicators. In most cases the indicator resolves impressed signals into visible intelligence constituting distance and direction of a reflecting object. Various methods are known whereby such distinctive signals may be impressed on the elements of a cathode ray oscillograph indicator. The resultant pattern on the screen of the cathode ray tube may be considered generally to be formed by the electron beam from the electron gun being displaced radially and circularly, this electron beam being propagated only in response to impressed signals.

In order to secure the directional indication, a rotatable directional antenna is coupled through a suitable circuit to rotatable magnetic deflecting coils mounted about the neck of the cathode ray tube, thereby providing a circular deflected trace on the screen that may be calibrated to indicate directivity.

This distance away of the object being "ranged" may be indicated by the radial displacement of suitably applied incoming signals if adequate intensity calibration is performed. Otherwise, a transmitter is used to radiate a pulse of energy, the reflected pulse from the object being passed through receiver means to control the flow of electron beam. In conjunction with this system a circuit is used to provide an indication of the instant of transmitting an impulse, and the instant of receiving a reflection of the impulse. Thus, either the magnitude of radial deflection or the distance between the indications on the screen of the cathode ray tube will give an estimate of the distance of the object.

Due to the means employed to secure a directivity reading, some of the luminescent spots will be of greater brilliance than others with respect to time, for the circular sweep of the electron beam may be relatively slow, say in the order of one revolution per second, and in this case the luminescent spot indications produced by the beam at the beginning of a revolution may be considerably dimmer than those being produced as the beam rotates around the screen. In certain applications considerable difficulty is experienced in securing sufficient brilliance of the screen of the cathode ray tube to afford good visibility in fairly strong light, or in daylight. It therefore may happen that the intensity of the beam will be increased to secure higher intensity of luminescent indications on the screen. If the intensity of the beam is increased, the production of ultraviolet fluorescence and the higher frequency visible light waves within the tube results in a brilliant blue line being produced radially of the screen along the trace of the beam. This is objectionable since the brilliance of this blue line tends to render indications (spots), left by the afterglow when the beam has passed on, harder to read. According to a feature of my invention this blue light formed in a line radially of the screen may be dimmed in brilliance or totally obscured by placing a rotatable, narrow, and radial opaque arm to substantially cover the area of this bright blue line. The filter arm may be so designed as to prevent the passage of the bright blue light, yet allow the spot indications (which are simultaneously produced), to be visible through the filter arm. It will be clear that if this arm is rotated in synchronism with the rotation of the electron beam, the presence of this bright blue line on the screen of the cathode ray tube will no longer be objectionable.

It is an object of my invention to provide means to prevent unwanted high frequency visible light rays, generally of a blue color, which may be generated within a high intensity cathode ray tube, from obscuring wanted signal indications that are simultaneously produced on the screen of the cathode ray tube.

It is a further object of my invention to provide means to render the initial brilliance of indications on the screen of a cathode ray tube indicating device less intense in color than would otherwise obtain.

It is a still further object of my invention to provide means to reduce to a minimum any background visible light radiation produced on the interior surfaces of the cathode ray tube screen that might tend to obscure other indications left by the afterglow on the screen of the cathode ray tube.

A better understanding of my invention and the objects and features thereof may be had by referring to the following detailed description and the accompanying drawings in which:

Fig. 1 is a schematic circuit diagram partly in block of equipment incorporating the principles of my invention;

Fig. 2 is an enlarged view of the screen of a cathode ray tube with light interferences due to the fluorescing rays on the screen;

Fig. 3 is an indication obtained with a high intensity beam cathode ray tube showing the generation of a bright blue line;

Figs. 4a and 5a are front or plan views of possible filters;

Figs. 4b and 5b are side views of possible filters;

Figs. 4c and 5c are side views of possible filters, the filtering portion being of a knife edge cross section;

Fig. 6 is a view of the indications obtained on the screen of a cathode ray tube as seen through a filter according to my invention.

Turning first to Fig. 1 there is shown a known circuit for applying signals to a cathode ray tube indicating device. The system as shown may be used to secure directivity readings in a radio direction finding system or a plane positioning system. In either case the readings on the screen will be formed by a circularly and radially displaced electron beam.

A transmitter 1 which is actuated by impulse generator 2 to producing a pulse of radio frequency energy which is radiated from antenna 3. During the short period of transmission receiver 4 is blocked against receiving any radiation from the transmitter 1 by means of receiver blocker 5 which is, in turn, actuated by the impulse generator 2. Time base circuit 6 is connected to the deflecting coils 7 and 8 which are positioned closely about the neck of the cathode ray tube shown generally at 9, including the components of an electron gun, such as cathode 10, concentrating electrode 11, and control grid 12 which is fed by receiver 4. The screen 13 of the cathode ray tube is of type composed of two layers shown in detail in Fig. 2. Electrons propagated from the electron gun will be deflected by potentials applied to deflecting coils 7 and 8, the resulting pattern being shown on the screen 13. All this is well known in the art and is shown here merely by way of background for a specific application of my invention.

As will be seen in Fig. 1, a directional and rotatable antenna 14 is used to feed receiver 4, the rotation being secured through antenna directivity rotating means 15. A shaft 16 is connected to rotating means 15 to interconnect gears 17 and 18 which in turn bear against and drive in synchronous rotation a support in spider 19 through ring gear 19a for deflection coils 7 and 8, and a ring gear 20 mounted about the circumference of a disc filter 21 which thereby caused to rotate in front of screen 13 in synchronism with the rotation of antenna 14.

Pulses sent out from transmitter 1 will be reflected back from reflecting objects towards antenna 14 which will receive these pulses only if its position in rotation allows the directive property of the antenna to pass a signal to receiver 4. Upon a signal reaching receiver 4, the control grid 12 in the cathode ray tube 9 allows a beam of electrons 22 to flow towards screen 13, the duration of propagation being dependent upon pulse rate and set characteristics in the receiver. Meanwhile, a varying potential may be applied to deflecting coils 7 and 8 through time base circuit 6 to give an additional radial sweep of the beam in its orbit. Any indication appearing on the screen will therefore be displaced radially as well as circularly, the radial deflection being a function of time, or a measure between the time pulse transmission and the time of its appearance on the screen as a reflection.

Fig. 2 will give a clearer understanding of the operation of an electron beam 22 impinging on a cathode ray tube screen comprising two layers of suitable phosphors, such as layer 23 which is a phosphor capable of fluorescing under the impact of electrons to produce a spot of ultra violet radiation shown generally at 24, and a glowing area 25 of the higher frequency visible light rays, usually of a brilliant blue color. The second layer 26 of a different material converts the high frequency fluorescence of spot 24 to a lower frequency spot of light 27 on layer 26. The lower frequency light radiates rays 28, rendering the spot visible to the viewer, while, some rays 29 radiate outwardly from the glowing area 25, their brilliant blue color tending to obscure rays 28 from the spot we wish to see. If the tube in use is used under a fairly strong light, increasing operation of the tube to produce a visible spot under such light also increase the blue light. In Fig. 3, there is shown such a situation, with a main spot 30 almost obscured by a bright blue line 31 of appreciable width. This bright blue line appears radially, being formed on the radial deflection pattern of the electron beam as may be seen by considering the imaginary trace of the electron beam shown by dotted lines 32. Due to the synchronism of the directive antenna 14 with the rotation of deflecting coils 7 and 8 the circular displacement of the beam is an indication of directivity, while the radial displacement of the spot is an indication of distance.

Our problem is to eliminate the bright blue line, and for this purpose I have designed a possible filter shown in Fig. 4a, in which a disc 33 of a completely transparent material has a narrow rectangular area 34 (constituting a radial arm), impregnated with suitable matter to absorb blue light radiation. It will be clear that when disc 33 is caused to rotate rectangular portion 34, being an integral part of the disc, will also rotate effectively as an arm describing a circular path. Fig. 4b is a side view of the same disc, showing a vertical view of the rectangular portion 34, while Fig. 4c shows portion 34 with the modification that the edges are tapered to form a knifelike cross section, as shown at 35, at the outside of the rectangular opaque portion, tapered to full thickness as shown at 36. The filter disc shown at 4a is suitable for use with a beam displaced radially from the center of the cathode ray tube screen outwardly to the periphery. In Fig. 5a I show a somewhat similar form of construction for use with an electron beam displaced radially across the complete diameter of the cathode ray tube screen. This filter disc also may be constructed with uniform cross sectional thickness, or tapering knifelike edges as shown at 37.

Fig. 6 is the view presented to an observer with the radial arm 34 of filter disc 33 positioned over two spots 38 and 39 which have just appeared on the screen of the cathode ray tube 13. For purposes of illustration arrow 40 indicates the direction of rotation of the filter disc. Hence the arm 34 is now positioned in synchronism with the rotating electron beam 22 to overlie the trace of the electron beam on the screen. As is evidenced from this view the transparent area 33 of the filter disc allows all indications left by the afterglow, such as spots 41, 42, 43, 44 and 45 to be clearly visible, while also allowing spots 38 and 39 to be somewhat less visible but still recognizable as indications. Opaque section 34 substantially prevents light rays eminating from the bright blue line produced radially on the screen from passing through section 34, thereby rendering all indications visible about the entire surface of the screen as seen through this preferred form of filter disc construction.

Each of the above mentioned filter discs performs essentially the same function, namely, eliminating the presence of an obscuring bright blue line, while rendering all indications clearly visible. By the use of such a rotatable filter arm a much higher concentration of energy within the tube and a more brilliant series of spots may be produced, since the bright line and its disadvantageous effects will be eliminated.

While I have described certain specific structures by way of illustration, many variations in the details thereof will be apparent to those versed in the art without departing from my invention. It should be understood, therefore, that this description is by way of example only, and not as a limitation of the scope of my invention as set forth in the objects thereof and the accompanying claims.

I claim:

1. A filter for use with a luminescent screen relative to which an electron beam is caused to sweep, comprising filter means providing an area of high filtering action, and means to move said filter means in synchronism with the sweep movement of said electron beam to maintain said area in overlying relation with respect to the portion of the screen impinged by said beam.

2. A filter for use with a luminescent screen relative to which an electron beam is caused to have a rotary sweep component, comprising a filter having a given filtering portion disposed radially of said screen, said filter being aligned with its portion of filtering action overlying the point of impingement of said beam on said screen, and means to rotate said filter in synchronism with the circular displacement of said electron beam.

3. A filter for use with a luminescent screen relative to which an electron beam is caused to sweep, comprising a narrow, radially extended filter of high filtering action, and means to move said radially extended filter in synchronism with the sweep movement of said electron beam.

4. A filter for use with a luminescent screen relative to which an electron beam is caused to sweep, comprising a filter having a radially extended area of high filtering action, and means to move said filter in synchronism with the sweep movement of said electron beam to maintain said area in overlying relation with respect to the portion of the screen impinged by said beam.

5. A filter for use with a cathode ray tube indicating device having luminescent screen relative to which an electron beam is caused to sweep, comprising a rotatable member of substantial transparency having a narrow radially extended portion of relative opaqueness, means to move said member in synchronism with the sweep movement of said electron beam to maintain said opaque portion of said member in overlying relation with respect to the portion of the cathode ray tube screen impinged by said beam.

6. A filter for use with a luminescent screen relative to which an electron beam is caused to sweep in a rotary manner comprising a rotatable member having a narrow knife-edged portion of relative opaqueness lying along a radial line from the center of rotation of said member, drive means to move said member in synchronism with the rotary sweep component of said electron beam to maintain the opaque portion thereof in overlying relation with respect to the portion of the cathode ray tube screen impinged by said beam.

7. In a position indicating system having a rotatable directive antenna, a cathode ray tube indicator including a luminescent screen relative to which an electron beam is caused to sweep, means for rotating the electron beam of said cathode ray tube synchronously with said antenna and means for controlling said electron beam in accordance with received signals; means for effectively subduing the initial brilliance of indications made on said screen in response to received signals comprising filter means providing an area of high filtering action rotated in synchronism with the sweep movement of said electron beam to maintain said area in overlying relation with respect to the portion of the screen impinged by said beam.

8. In a cathode ray tube indicating device having a screen comprised of two layers, a rotatable beam which impinges upon the first layer of said screen to produce an ultraviolet spot of high intensity and a colored light radiation of relatively lower intensity, said ultraviolet spot producing rays which pass through said first layer and react with the second layer of said screen converting said rays into luminous light, said colored light from said first layer passing through both of said layers; the improvement comprising a rotatable color-filter having a radially extended portion of high filtering action, means to rotate said filter in synchronism with the sweep movement of said electron beam to maintain said area in overlying relation with respect to the portion of the screen impinged by said beam so that said colored light of low intensity will be substantially obscured allowing said luminous light from said second layer to be transmitted through the filtering portion thereby rendering said luminous light visible to the viewer.

9. In a cathode ray tube indicating device having a screen comprised of two layers, a rotatable beam which impinges upon the first layer of said screen to produce an ultraviolet spot of high intensity and a colored light radiation of relatively lower intensity, said ultraviolet spot producing rays which pass through said first layer and react with the second layer of said screen converting said rays into luminous light, said colored light from said first layer passing through both of said layers; the improvement comprising a rotatable color filter having a radially extended portion of high filtering action and edge portions that taper in directions transverse to the radial direction thereof, means to rotate said filter in synchronism with the rotary sweep movement of said electron beam to maintain said portion in overlying relation with respect to the portion of the screen impinged by said beam so that said colored light of low intensity will be substantially obscured allowing said luminous light from said second layer to be transmitted through the filtering portion thereby rendering said luminous light visible to the viewer.

10. In a cathode ray tube indicating device having a screen comprised of two layers, a rotatable beam which impinges upon the first layer of said screen to produce an ultraviolet spot of high intensity and a colored light radiation of relatively lower intensity, said ultraviolet spot producing rays which pass through said first layer and react with the second layer of said screen converting said rays into luminous light, said colored light from said first layer passing through both of said layers; the improvement comprising a rotatable color filter member having a radially extended portion, substantially of high filtering action, the remaining area of said member being substantially transparent, means to rotate said member about its center of rotation in synchronism with the rotary sweep movement of said electron beam to maintain said portion in overlying relation with respect to the portion of the screen impinged by said beam so that said colored light of low intensity will be substantially obscured allowing said luminous light from said second layer to be transmitted through the filtering portion thereby rendering said luminous light visible to the viewer.

11. In an object detection system in which periodically recurrent impulse energy is directly radiated in a generally circular sweep, having receiver means responsive to reflections of said impulse energy for indicating the direction and distance of reflecting objects, said receiver means including a cathode ray indicating means having electron beam control means including circular sweep deflection means and radial deflection means, means for operating said circular sweep means in synchronism with said generally circular sweep of said directional radiation, means coupled to said radial deflection means for producing a radial deflection corresponding to the delay between a transmitter impulse and a received reflection thereof, and means in said cathode ray tube indicating means for providing an indication of the direction and distance of said reflecting objects in accordance with the portion of the cathode ray beam under displacement control of said deflecting means, said indicating means including a luminescent screen relative to which the electron beam is caused to sweep; a filter comprising a substantially transparent disc having a radially extended area of high filtering action, means to rotate said disc in synchronism with the rotary sweep movement of said electron beam to maintain said area in overlying relation with respect to the portion of the screen impinged by said beam, said area effectively obscuring any radial line of light produced on the screen of said cathode ray indicating means, while rendering indications visible elsewhere about the face of said screen.

AVERY G. RICHARDSON.

REFERENCES CITED

The following references are of record in the file of this patent:

UNITED STATES PATENTS

| Number | Name | Date |
|---|---|---|
| 2,208,209 | Busignies | July 16, 1940 |